United States Patent Office 3,640,993
Patented Feb. 8, 1972

3,640,993
BASIC AZO DYESTUFFS CONTAINING AN N-ACYL-AMINO-N'-PYRIDINIUM LOWER ALKYL-ENEAMINOPHENYL GROUP
Gert Hegar, Schoenenbuch, Switzerland, assignor to Ciba Limited, Basel, Switzerland
No Drawing. Filed Nov. 26, 1968, Ser. No. 779,255
Claims priority, application Switzerland, Dec. 6, 1967, 17,110/67; Oct. 15, 1968, 15,402/68
Int. Cl. C09b 29/36, 43/00
U.S. Cl. 260—146 R   11 Claims

ABSTRACT OF THE DISCLOSURE

Basic azo deystuffs, which are free from acidic groups imparting solubility in water of the formula

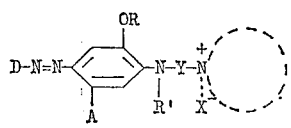

in which D represents the residue of a diazo component, A an acylamino group, Y a linear or branched aliphatic carbon chain, R' represents hydrogen or an alkyl, aralkyl or cycloalkyl residue, R an alkyl, aralkyl, cycloalkyl or aryl residue and X an anion. The dyestuffs are suitable for use in dyeing and printing; are suitable for the bulk coloration of polyacrylonitrile polymers and are fast to light and washings.

The present invention provides new azo dyestuffs which are free from acidic groups imparting solubility in water, especially sulphonic and carboxylic acid groups, of the formula (1) 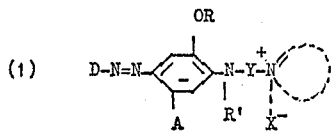

in which D represents the residue of a diazo component, A an acylamino group, Y a linear or branched aliphatic carbon chain containing preferably no more than four carbon atoms, R' represents hydrogen or an alkyl, aralkyl or cycloalkyl residue, R an alkyl, aralkyl, cycloalkyl or aryl residue and X represents an anion.

According to the present invention the new dyestuffs may be manufactured by amidation or condensation or coupling. The manufacture by amidation or condensation is carried out by treating a reactive dyestuff derivative with a cyclic amine that contains a reactive atom or a reactive group. Thus, for example, a compound of the formula (2) 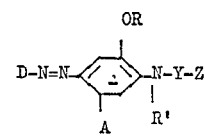

in which D, A, R, R' and Y have the above meanings and Z represents a reactive atom or a reactive group, for example a halogen atom or an ester grouping, may be reacted with an amine of the formula (3) 

or a compound of the formula (4) 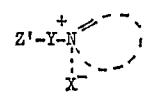

in which Y and X have the above meanings and Z' represents a reactive atom or a reactive group, for example a halogen atom or a sulphato group, may be reacted with a compound of the formula (5) 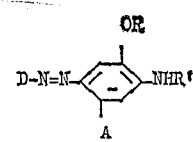

in which D, A, R and R' have the above meanings.
The manufacture by coupling may be carried out by coupling a diazo compound with a coupling component of the formula (6) 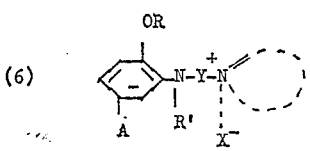

in which A, R, R', Y and X have the above meanings.

Azo dyestuffs that may be mentioned are those obtained by coupling a diazotized amine, preferably of the aromatic or heterocyclic series, with a coupling component derived from an etherified 2-amino-4-acylaminophenol. A list of suitable diazo and coupling components is given below in connection with the explanation of the manufacture by coupling.

These dyestuffs are reacted according to process (a) of the present invention with an amine of the Formula 3 or 4. Suitable amines of the Formula 3 are, for example: Pyridine, picoline, lutidine, quinoline and pyrimidine. As an amine of the Formula 4 N-β-chlorethylpyridinium chloride may be mentioned.

The reaction of the dyestuff containing, for example, a halogen- or sulphato-alkyl group, with the amine is carried out in a neutral solvent, for example in chlorobenzene, an alcohol, an aqueous alcohol mixture or in dimethylformamide, or if desired without a solvent, advantageously at an elevated temperature in an excess of the amine and, if desired, in the presence of a catalyst, for example sodium iodide.

According to process (b) of the invention an amine may also be reacted with a dyestuff intermediate instead of with the dyestuff, and subsequent coupling of the reaction products thus obtained gives rise to the final product.

As examples of diazo components aromatic compounds may be mentioned in the first place, for example those of the naphthalene or especially the benzene series. These compounds may correspond, for example, to the formula

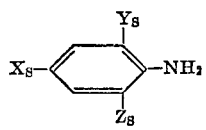

in which $X_S$ represents a hydrogen or halogen atom, a cyano, carbalkoxy, alkanoyl, alkylsulphonyl, carbonamide, sulphonamide, phenylazo or nitro group, $Y_S$ represents a hydrogen or halogen atom, a nitro, alkyl, alkoxy, trifluoromethyl, carbalkoxy or cyano group, $Z_S$ a hydrogen or halogen atom, a nitro or alkylsulphonyl group, and at least one of the residues $X_S$ or $Y_S$ is a halogen atom, a nitro, carbalkoxy, cyano, alkylsulphonyl or phenylazo group.

As examples the following aminobenzenes may be mentioned:
1-amino-2-chlorobenzene,
1-amino-4-chlorobenzene,
1-amino-4-bromobenzene,
1-amino-2-nitrobenzene,
1-amino-3-nitrobenzene,
1-amino-4-nitrobenzene,
1-amino-4-cyanobenzene,
1-amino-2-methoxybenzene,
1-amino-4-methoxybenzene,
1-amino-2,5-dicyanobenzene,
1-amino-4-carbalkoxybenzene,
1-amino-2,4-dibromobenzene,
1-amino-2,4-dichlorobenzene,
1-amino-2,5-dichlorobenzene,
1-amino-2-methyl-4-chlorobenzene,
1-amino-2-nitro-4-trifluoromethylbenzene,
1-amino-2-trifluoromethyl-4-chlorobenzene,
1-amino-3-trifluoromethyl-2-chlorobenzene,
2-amino-5-nitrotrifluoromethylbenzene,
1-amino-2-cyano-4-chlorobenzene,
1-amino-2-cyano-4-nitrobenzene,
1-amino-2-nitro-4-methoxybenzene,
2-aminobenzoic acid methyl ester,
4-aminobenzoic acid-β-methoxyethyl ester,
2-amino-5-chlorobenzoic acid methyl ester,
2-amino-5-nitrobenzoic acid methyl ester,
4-aminobenzoic acid-β-dimethylaminoethyl ester,
4-aminobenzoic acid-γ-dimethylaminopropylamide,
4-amino-3-nitrobenzoic acid-β-diethyl-aminoethyl ester,
4-amino-3-nitrobenzoic acid-γ-dimethylaminopropylamide,
sulphanilic acid-β-N-trimethylaminoethylamide,
1-amino-2-chloro-4-cyanobenzene,
1-amino-2-chloro-4-nitrobenzene,
1-amino-4-chloro-2-nitrobenzene,
1-amino-2-chloro-4-carbethoxybenzene,
1-amino-2-methylsulphonylbenzene,
1-amino-4-methylsulphonylbenzene,
1-amino-2-methylsulphonyl-4-nitrobenzene,
1-amino-6-methylsulphonyl-2,4-dinitrobenzene,
1-amino-2-chloro-4-methylsulphonylbenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino-2,4-dicyano-6-chlorobenzene,
1-amino-2,4-dinitro-6-chlorobenzene,
1-amino-2-cyano-4-nitro-6-chlorobenzene,
1-amino-2-cyano-4-nitro-6-bromobenzene,
1-amino-2,4-dinitro-6-bromobenzene,
1-amino-2,4-dinitro-6-cyanobenzene,
3-amino-benzenesulphonic acid amide,
4-aminobenzenesulphonic acid monoethylamide,
4-amino-3-chlorobenzenesulphonic acid diethylamide,
4-amino-3-chlorobenzenesulphonic acid monoethylamide,
4-aminobenzenesulphonic acid ethyl ester,
4-aminoazobenzene,
4-amino-2'-chloro-azobenzene,
4-amino-2',4-dichloro-azobenzene,
4-amino-3'-chloro-azobenzene,
4-amino-2'-nitro-azobenzene,
4-amino-3-nitro-azobenzene,
4-amino-3'-nitro-azobenzene,
4-amino-2-methyl-azobenzene,
4-amino-4'-methoxy-azobenzene,
4-amino-3-nitro-2'-chloroazobenzene,
4-amino-3-nitro-4'-chloroazobenzene,
4-amino-3-nitro-2',4'-dichloro-azobenzene and
4-amino-3-nitro-4'-methoxy-azobenzene.

The diazo component used may also be any desired diazotizable heterocyclic amine that is free from acidic substituents imparting solubility in water, more especially amines that contain a 5-membered heterocycle containing 2 or 3 hetero atoms, especially one nitrogen and one or two sulphur, oxygen or nitrogen atoms as hetero atoms, for example:
2-aminothiazole,
2-amino-5-nitrothiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
2-amino-benzthiazole,
2-amino-triazole,
2-amino-6-methylbenzthiazole,
2-amino-6-methoxybenzthiazole,
2-amino-6-chlorobenzthiazole,
2-amino-6-nitrobenzthiazole,
2-amino-6-cyanobenzthiazole,
2-amino-6-carboethoxybenzthiazole,
2-amino-6-methylsulphonylbenzthiazole, 2-amino-1,3,4-thiadiazole,
2-amino-1,3,5-thiadiazole and
2-amino-4-phenyl-1,3,5-thiadiazole.

As coupling components the following examples may be mentioned: in these formulae Q represents a cyclic amino group of the formula

bound through the nitrogen atom or, when this group is only subsequently introduced by condensation according to manufacturing process (a), a reactive atom or a reactive group, for example, a halogen atom, a sulphato group or an aryl- or alkyl-sulphonyloxy group.

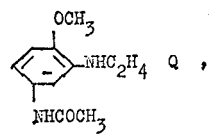 , 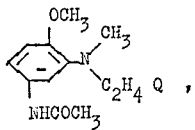 ,

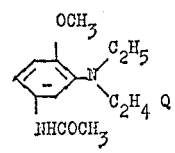 , 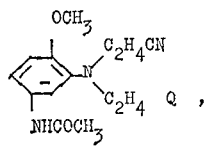 ,

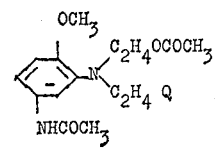 , 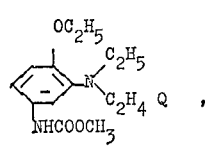 ,

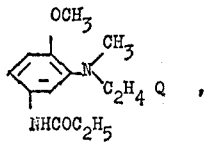 , 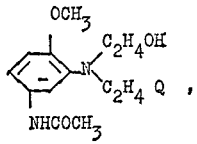 ,

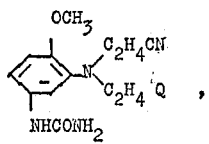 , 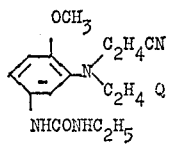 ,

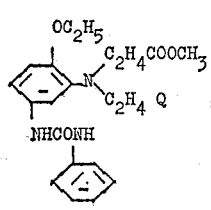 , 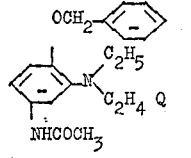 ,

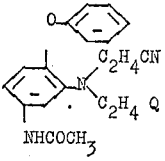 , 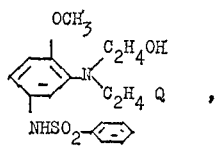 ,

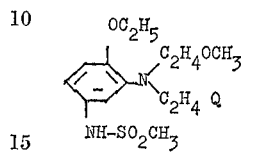 , 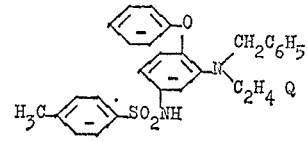 ,

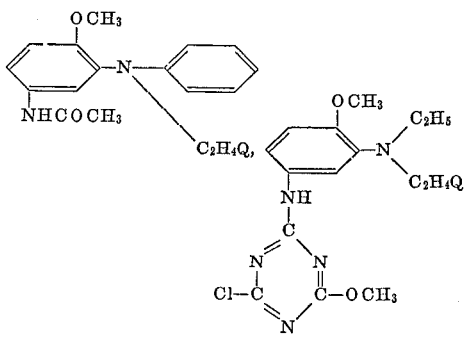

Instead of a single diazo component a mixture of two or more of the diazo components according to the invention and instead of a single coupling component a mixture of two or more of the coupling components according to the invention may be used.

The above-mentioned diazo components may be diazotized by known methods, for example with a mineral acid, especially hydrochloric acid, and sodium nitrite, or, for example, with a solution of nitrosylsulphuric acid in concentrated sulphuric acid.

The coupling may also be carried out in known manner, for example in a neutral to acid medium, if desired in the presence of sodium acetate or a similar buffer capable of influencing the rate of coupling or of a catalyst, for example pyridine or a salt thereof.

Should purification of the dyestuff salts be at all necessary, it is advantageously carried out by dissolving them in water; any unreacted starting dyestuff forms an insoluble residue which can be filtered. The dyestuff can be precipitated again from the aqueous solution by addition of a water-soluble salt, for example sodium chloride.

The quaternated dyestuffs obtained by the present invention preferably contain as anion the residue of a strong acid, for example sulphuric acid, or a semi-ester thereof, or of an arylsulphonic acid or a hologen ion. The said anions, which according to this invention are introduced into the dyestuff molecule, may if desired, be replaced by anions of other inorganic acids, for example phosphoric or sulphuric acid, or of organic acids, for example for formic, lactic or tartaric acid. In certain cases the free bases may be used. The dyestuff salts may, if desired, be used in form of double salts, for example with halides of the elements of Group 2 of the Periodic Table, especially with zinc chloride or cadmium chloride.

The new dyestuffs or dyestuff salts containing a quaternated amino group are suitable for dyeing or printing a wide variety of fully synthetic fibres, for example polyvinylchloride, polyamide or polyurethane fibres, also fibres of polyesters of aromatic dicarboxylic acids, for example polyethylene terephthalate fibres, and especially materials consisting of polyacrylonitrile fibres or polyvinylidene cyanide fibres (Darvan—a registered Trademark). The term polyacrylonitrile fibres is to be understood to include mainly polymers containing more than 80%, for example 80 to 95% of acrylonitrile;; in addition they may contain 5 to 20% of vinyl acetate, vinyl pyridine, vinyl chloride, vinylidene chloride, acrylic acid, acrylic esters, methacrylic acid and methacrylic esters. These products are marketed, for example, under the following registered trade names: "Acrilan 1656" and "Acrilan 41" (The Chemstrand Corporation, Decatur, Ala., U.S.A.), "Creslan" (American Cyanamide Company), "Orlon 44" (Du Pont), "Crylor HH" (Soc. Rhodiacéta SA, France), "Leacril N" (Applicazioni Chimice S.A., Italy), "Dynel" (Union Carbide Chem. Corp.), "Exlan" (Japan. Exlan Industry Co., Japan), "Vonnel" (Mitsubishi, Japan), "Verel" (Tennessee Eastman, U.S.A.), "Zefran" (Dow Chemical, U.S.A.), "Wolcrylon" (Filmfabrik Agfa, Wolfen), "Ssaniw" (U.S.S.R.) and "Orlon 42," "Dralon," 'Courtelle" and the like.

On these fibres, which may also be dyed in admixture with one another, the new dyestuffs produce deep and level shades having good light fastness and good general fastness properties, especially good fastness to washing, perspiration, sublimation, creasing, decatizing, ironing, rubbing, carbonizing, water, sea water, dry-cleaning, over-cleaning, over-dyeing and solvents. The new dyestuffs of this invention also display, inter alia, good stability within a considerable pH range, good affinity, for example in aqueous solutions of various pH values and good fastness to caustic kier boiling. Moreover, the new dyestuffs generally reserve well on wool and other natural polyamide fibres.

The quaternated, water-soluble dyestuffs are in general a little sensitive to electrolytes and some of them are readily soluble in water or in polar solvents. Dyeing with the quaternated, water-soluble dyestuffs is generally performed in aqueous neutral or acid media, at the boil under atmospheric pressure or in a closed vessel at an elevated temperature and elevated pressure. They are not affected by commercial levelling agents, but these agents are not necessary either.

The new dyestuffs are especially suitable for three colour dyeing. Furthermore, by virtue of their stability to hydrolysis they may be advantageously used for high-temperature dyeing and for dyeing in the presence of wool. They may also be used for printing fibrous materials, for example with a printing paste that contains the dyestuff together with the assistants generally used in printing. They are also suitable for the bulk colouration of acrylonitrile polymers as well as other plastic masses, if desired in solution, shades fast to light and washing, and for colouring oil paints and lacquers. They may also be used for dyeing cotton, especially mordanted cotton, cellulose, regenerated cellulose and paper.

According to the present process the new dyestuffs may also be used for printing, for example with a printing paste that contains the finely dispersed or dissolved dyestuff, together with the assistants generally used in printing, for example wetting or thickening agents, if desired in the presence of an organic and/or inorganic acid.

The dyeings and prints obtained by the above processes have good tinctorial strength and excellent fastness properties, especially fastness to light, sublimation, decatizing, washing, and chlorine water. Another advantage is that the dyestuffs to be used according to this invention resist wool and other natural polyamide fibers well.

Unless otherwise indicated, parts and percentages in the following examples are by weight.

EXAMPLE 1

4.35 parts of 2-chloro-4,6-dinitroaniline are added at room temperature to 25 parts by volume of N nitrosylsulphuric acid. The reaction mixture is stirred for 1 hour at 20 to 25° C., then stirred into 100 parts of ice and the excess nitrous acid decomposed with sulphamic acid. The resulting diazo solution is immediately added to a solution of 9.42 parts of N,2-(N'-[2'-methoxy-5'-acetylamino-phenyl]-N'-methyl)-aminoethyl-pyridinium toluene sulphonate in 100 parts of water and 100 parts of ice. The whole is stirred for 1 hour, the dyestuff is filtered, dissolved again in 500 parts of water and 5 parts of crystalline sodium acetate and salted out with 10 parts of sodium bromide. After drying, a black dyestuff powder is obtained which dyes polyacrylonitrile fibres from an aqueous bath navy shades that are very fast to light.

Manufacturing the coupling component

A solution of 47.6 parts of 2-(N-[2'-methoxy-5'-acetylaminophenyl]-N-methylamino)ethanol in 100 parts of pyridine is mixed within 30 minutes at 10–15° C. with 42 parts of p-toluenesulphonylchloride. The whole is stirred for 45 minutes at the indicated temperature, poured over 800 parts of a mixture of ice and water and stirred until complete crystallization has occurred. The toluene sulphonic acid ester formed is then filtered, washed pyridine-free with cold water and dried at a low temperature.

38 parts of 2-(N-[2'-methoxy-5'-acetylaminophenyl]-N-methylamino)ethyl-toluene sulphonate and 15 parts of pyridine are refluxed for 4 hours at a bath temperature of 150° C. The pyridinium salt thus formed can be obtained in crystalline form by diluting the cooled melt with ethyl acetate. If desired, the clear solution obtained by diluting the melt with water may be used as it is for coupling.

EXAMPLE 2

20 parts of 2-chloro-4-nitro-6-cyanoaniline are added at 0 to 5° C. to a mixture of 105 parts by volume of N nitrosylsulphuric acid and 100 parts by volume of a 6:1-mixture of glacial acetic acid and propionic acid. Another 100 parts of the glacial acetic acid+propionic acid mixture are then added and the whole is stirred for 2 hours in an ice bath, 10 parts of urea are then added and the yellowish diazo solution is added to a well stirred mixture of 36.4 parts of a coupling component of the formula

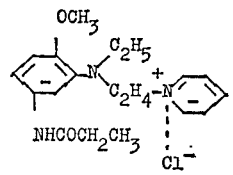

in 1000 parts of water and 500 parts of ice. The dyestuff, which precipitates in an acid solution, is suction filtered, suspended in 2000 parts of water and dissolved by adding crystalline sodium acetate until the solution reacts neutral to Congo red. The dyestuff is salted out with 100 parts of sodium chloride, filtered and dried; it corresponds to the formula

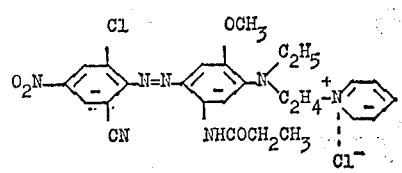

and dyes polyacrylonitrile fibres fast blue tints.

Further dyestuffs of the general formula

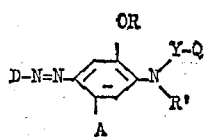

are listed in the following table; they are accessible by coupling as described in Examples 1 and 2.

| | D | R | R' | A | Y | Q | Shade |
|---|---|---|---|---|---|---|---|
| 1 | O₂N–⌬– | —CH₃ | —CH₃ | —NHCOCH₃ | —(CH₂)₂— | ⌬N | Red. |
| 2 | Same as above | —C₂H₅ | —C₂H₅ | —NHCOOC₂H₅ | —(CH₂)₂— | Same as above | Red. |
| 3 | O₂N–⌬–Cl | —CH₃ | —H | —NHCOCH₃ | —(CH₂)₂— | do | Claret. |
| 4 | Same as above | —CH(CH₃)₂ | —CH₃ | —NHCOOC₂H₅ | —(CH₂)₃— | do | Do. |
| 5 | do | —CH₃ | —CH₃ | —NHCONHC₂H₅ | —(CH₂)₃— | do | Do. |
| 6 | O₂N–⌬–CN | —CH₂⌬ | —H | —NHCOCH₃ | —(CH₂)₂— | do | Violet. |
| 7 | NC–⌬– | —CH₃ | —C₂H₄CN | —NHCOCH₃ | —(CH₂)₂— | do | Red. |
| 8 | H₃COCO–⌬– | —CH₃ | —CH₃ | —NHCOCH₃ | —(CH₂)₂— | ⌬N–CH₃ | Red. |
| 9 | CH₃CO–⌬–Cl | —CH₃ | —CH₃ | —NHCOCH₃ | —(CH₂)₂— | Same as above | Red. |
| 10 | Same as above | —C₂H₅ | —C₂H₅ | —NHCOCH₃ | —(CH₂)₂— | ⌬(CH₃)₂N | Red. |
| 11 | Cl–⌬(Cl)–O₂N | —CH₃ | —CH₃ | —NHCONH₂ | —(CH₂)₂— | ⌬N | Reddish brown. |
| 12 | NO₂–⌬(Cl)–O₂N* | —CH₃ | —C₂H₅ | —NHCOCH₃ | —(CH₂)₂— | Same as above | Navy blue. |
| 13 | Same as above | —C₂H₅ | —C₂H₅ | —NHCOOC₂H₅ | —(CH₂)₂— | do | Do. |
| 14 | do | —C₂H₉ | —C₂H₄OCH₃ | —NHCOCH₃ | —(CH₂)₂— | do | Do. |
| 15 | do | —CH₂⌬ | C₂H₄CN | —NHCOCH₃ | —(CH₂)₂— | do | Violet. |
| 16 | do | ⌬H | CH₃ | —NHCOOC₂H₅ | —(CH₂)₂— | do | Navy blue. |

| | D | R | R' | A | Y | Q | Shade |
|---|---|---|---|---|---|---|---|
| 17 | Same as above (see *) | —CH₃ | —CH₃ | —NHCOOC₂H₅ | —(CH₂)₂— | pyridine | Navy blue. |
| 18 | do | —C₂H₅ | —CH₂—C₆H₅ | —NHCO—C₆H₅ | —(CH₂)₂— | Same as above | Do. |
| 19 | do | —CH₃ | —C₆H₁₁ (H) | —NHSO₂CH₃ | —(CH₂)₃— | quinoline | Blue. |
| 20 | do | —CH₃ | —CH₃ | —NHSO₂—C₆H₄—CH₃ | —(CH₂)₂— | pyridine | Navy blue. |
| 21 | do | —CH₃ | —C₂H₅ | —NHCO—C₆H₁₀(H) | —(CH₂)₂— | Same as above | Do. |
| 22 | do | —CH₃ | —C₂H₅ | —NHCO—(thienyl) | —(CH₂)₂— | do | Do. |
| 23 | do | —CH₂— | —CH₃ | —NHCOOC₂H₅ | —CH₂—CHCH₃— | do | Do. |
| 24 | do | —CH₃ | —CH₃ | —NHCOCH₃ | —(CH₂)₂— | do | Do. |
| 25 | Same as above | —CH₃ | —CH₃ | —NHCO—C₆H₅ | —(CH₂)₂— | indoline | Do. |
| 26 | do | —CH₃ | —CH₃ | —NHCOC₄H₉ | —CH₂—CHCH₃— | pyridine | Do. |
| 27 | do | —CH₃ | —C₂H₅ | —NHCOOCH₃ | —(CH₂)₂— | Same as above | Do. |
| 28 | do | —CH₃ | —C₂H₅ | —NHCONHC₄H₉ | —(CH₂)₂— | do | Do. |
| 29 | do | —C₄H₉ | —C₂H₄OCH₃ | —NHCOCH₃ | —(CH₂)₂— | do | Do. |
| 30 | do | —CH₃ | —CH₃ | —NHSO₂CH₃ | —(CH₂)₂— | 4-methylpyridine | Do. |
| 31 | (2-Cl, 4-NO₂, 6-CN phenyl) | —CH₃ | —CH₃ | —NHCOCH₃ | —(CH₂)₂— | pyrazine | Blue. |

Note: Rows 18 and 24 contain a Br/NO₂/O₂N-substituted phenyl in column D as indicated.

| | D | R | R' | A | Y | Q | Shade |
|---|---|---|---|---|---|---|---|
| 32 | Same as above (see †) | —CH₃ | —CH₃ | —NHCOOC₂H₅ | —(CH₂)₂— | pyridyl (N) | Blue. |
| 33 | do | —CH₃ | —CH₃ | —NHCO-C₆H₅ | —(CH₂)₂— | Same as above | Do. |
| 34 | do | —C₂H₅ | —CH₃ | —NHCOCH₃ | —(CH₂)₂— | do | Do. |
| 35 | do | —C₆H₅ (phenyl) | —CH₃ | —NHCOOC₂H₅ | —(CH₂)₂— | do | Do. |
| 36 | do | —CH₃ | CH₂CH₂CN | —NHCOCH₃ | —(CH₂)₂— | do | Reddish blue. |
| 37 | do | cyclohexyl (H) | —CH₃ | —NHCOOC₂H₅ | —(CH₂)₂— | do | Blue. |
| 38 | do | —CH₃ | CH₃ | NHSO₂CH₃ | —(CH₂)₃— | do | Greenish blue |
| 39 | do | —CH₃ | —CH₃ | triazine-OCH₃ | —(CH₂)₂— | do | Blue. |
| 40 | do | —CH₃ | —CH₂CH₂OC₂H₅ | —NHSO₂-C₆H₅ | —(CH₂)₂— | do | Do. |
| 41 | do | —CH₃ | —C₂H₅ | —NHCO-cyclohexyl (H) | —(CH₂)₂— | do | Do. |
| 42 | do | —C₂H₅ | —C₂H₅ | —NHCOOC₂H₅ | —(CH₂)₂— | do | Do. |
| 43 | do | —CH₃ | —CH₃ | —NHCONHC₄H₉ | —(CH₂)₂— | 4-CH₃-pyridyl | Blue. |
| 44 | do | —C₂H₅ | —C₂H₅ | —NHCOC₂H₅ | —(CH₂)₂— | Same as above | Do. |
| 45 | do | —CH₃ | —CH₃ | —NHCOOC₂H₅ | —(CH₂)₃— | Same as above | Greenish blue. |
| 46 | do | —C₂H₅ | —C₂H₅ | —NHCOCH₂-C₆H₅ | —(CH₂)₂— | do | Blue. |
| 47 | do | —CH₃ | —CH₃ | —NHCOCH₃ | —(CH₂)₂— | do | Do. |
| 48 | (C₂H₅)₂NSO₂—C₆H₃(Cl)(Cl)— | —CH₃ | —CH₃ | —NHCOCH₃ | —(CH₂)₃— | do | Red. |
| 49 | Same as above | —CH₃ | —C₂H₅ | —NHCOOC₂H₅ | —(CH₂)₂— | do | Yellowish red |

| # | D | R | R' | A | Y | Q | Shade |
|---|---|---|---|---|---|---|---|
| 50 | O₂N-C(=N)-C(=O)-S (structure) | —CH₃ | —CH₃ | —NHCOCH₃ | —(CH₂)₂— | pyridine | Greenish blue. |
| 51 | Same as above | —C₂H₅ | —C₂H₅ | —NHCOOC₂H₅ | —(CH₂)₂— | Same as above | Do. |
| 52 | do | —CH₃ | —H | —NHCOCH₃ | —(CH₂)₂— | do | Do. |
| 53 | do | —CH₂-phenyl | CH₂CH₂CN | —NHCOCH₃ | —(CH₂)₂— | do | Blue. |
| 54 | do | —CH₃ | —CH₃ (phenyl) | —NHCOOC₂H₅ | —(CH₂)₂— | do | Greenish blue. |
| 55 | H₅C₂O-benzothiazole (structure) | —CH₃ | —CH₃ | —NHCOC₂H₅ | —(CH₂)₂— | do | Bluish red. |
| 56 | Same as above | —C₂H₅ | —C₂H₅ | —NHCOOC₂H₅ | —(CH₂)₂— | do | Do. |
| 57 | do | —C₄H₉ | —C₂H₄OCH₃ | —NHCOCH₃ | —(CH₂)₂— | do | Do. |
| 58 | do | —CH₂-phenyl | C₂H₄CN | —NHCOCH₃ | —(CH₂)₂— | do | Red. |
| 59 | do | —C₆H₅ | —CH₃ | —NHCOOC₂H₅ | —(CH₂)₂— | do | Bluish red. |
| 60 | do | —CH₃ | —CH₃ | —NHSO₂CH₃ | —(CH₂)₂— | do | Do. |
| 61 | O₂N-benzothiazole (structure) | —CH₃ | —CH₃ | —NHCOCH₃ | —(CH₂)₂— | quinoline (CH₃) | Violet. |
| 62 | Same as above | —CH₃ | —C₂H₅ | —NHCONHC₂H₅ | —(CH₂)₂— | pyridine | Do. |
| 63 | do | —CH₃ | —C₂H₄CN | —NHCOOCH₃ | —(CH₂)₂— | Same as above | Do. |
| 64 | do | —CH₃ | —CH₂-phenyl | —NHCOOC₂H₃ | —(CH₂)₂— | do | Do. |
| 65 | do | —CH₃ | —CH₃ | —NHSO₂-C₆H₄-CH₃ | —(CH₂)₂— | do | Do. |
| 66 | N=C-S-phenyl (structure) | —CH₃ | —CH₃ | —NHSO₂CH₃ | —(CH₂)₂— | pyridine (CH₃) | Bluish red. |
| 67 | Same as above | —C₂H₅ | —CH₃ | —NHCOC₃H₇ | —(CH₂)₂— | Same as above | Do. |
| 68 | do | —CH₃ | —CH₃ | —NHOC-phenyl | —(CH₂)₂— | pyridine | Do. |

EXAMPLE 3

13.8 parts of 4-nitroaniline are dissolved at 80° C. in 60 parts of 5 N hydrochloric acid and the solution is poured over 100 parts of ice. While stirring well, 7 parts of sodium nitrate are added and the whole is stirred until all has dissolved. A slight excess of nitrous acid is decomposed with 0.5 part of sulphamic acid. This diazo solution is run into a solution of 28.3 parts of a coupling component of the formula

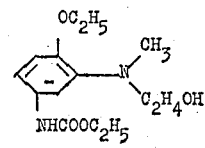

in 1000 parts of water, 500 parts of ice and 12 parts of 10 N hydrochloric acid and the whole is stirred at 0° C. while slowly adding 50 parts of crystalline sodium acetate. The completely precipitated dyestuff is suction-filtered, washed with water and dried. It is then dissolved in 80 parts of pyridine and 22 parts of p-toluene sulphonyl-chloride are added at 10 to 15° C. The reaction mixture is stirred for 4 hours and then poured into 1000 parts of ice water. The dyestuff of the formula

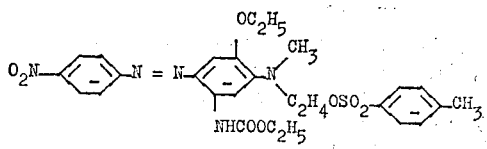

is filtered, washed pyridine-free with water and dried at a low temperature.

6 parts of the above dyestuff are stirred with 2 parts of α-picoline for 3 hours at about 140° C., and the reaction mixture is diluted with 250 parts of water. When the clear red solution is salted out with 10 parts of sodium bromide it yields the dyestuff of the formula

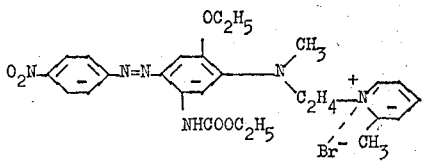

which dyes polyacrylonitrile fast bluish red shades.

Further dyestuffs giving a similar shade are obtained when the above-mentioned toluenesulphonic ester is reacted with pyridine, β- or γ-picoline, lutidine, quinoline or isoquinoline or with mixtures of these compounds instead of with α-picoline.

Dyeing instruction A 1 part of dyestuff is dissolved in 5000 parts of water with addition of 2 parts of 40% acetic acid. This dyebath is heated to 60° C. and 100 parts of dried yarn made of polyacrylonitrile staple fibres are immersed in it; the temperature is raised to 100° C. during half an hour and the yarn is dyed for 1 hour at the boil, then thoroughly rinsed and dried.

Dyeing instruction B (continuous dyeing process)

A padding liquor is prepared from 40 parts of dyestuff, 40 parts of 80% acetic acid, 3 parts of a carob bean thickener and 1000 parts of water. A fabric of polyacrylonitrile fibres is immersed in this liquor at 50° C. and padded to a weight increase of 100% (after squeezing) and then steamed for 45 minutes at 100° C. in a continuous steamer. It is then thoroughly rinsed and dried.

Dyeing instruction C (high-temperature dyeing process)

2 parts of dyestuff are dissolved in 3000 parts of water with addition of 1 part of crystalline sodium acetate, 5 parts of calcined Glauber's salt and sufficient acetic acid to attain a pH value from 4.5 to 5. 100 parts of polyacrylonitrile filament yarn are immersed at 80° C. in this bath, the temperature is raised during 45 minutes to a maximum of 120° C. and dyeing is carried out for 30 minutes at 120° C. The whole is then slowly cooled and the yarn rinsed.

Dyeing instruction D (printing)

A printing paste is prepared from 20 parts of dyestuff, 50 parts of 40% acetin acid, 20 parts of thiodiethyleneglycol and 600 parts of 50% gum arabic thickener and made up to 1000 parts with water. A polyacrylonitrile fabric is printed with this paste, subjected to an intermediate drying and then treated with saturated steam at 0 to 0.75 atmosphere pressure for 30 minutes. The fabric is then washed and dried.

I claim:

1. A basic azo-dyestuff free from acidic groups imparting solubility in water, of the formula

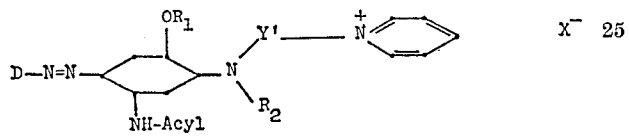

wherein D is a member of the group consisting of thiazol-2-yl-, 5-nitrothiazol-2-yl-, 5-cyanothiazol-2-yl-, 4-methyl-5-nitrothiazol-2-yl-, 4-methylthiazol-2-yl-, 4-phenylthiazol-2 - yl - , 4-(4'-chloro-)phenylthiazol-2-yl-, 4-(4'-nitro-)phenylthiazol - 2 - yl-, benzthiazol-2-yl-, 6-methylbenzthiazol-2-yl-, 6-methoxybenzthiazol-2-yl-, 6-chlorobenzthiazol-2-yl-, 6-nitrobenzthiazol-2-yl-, 6-cyanobenzthiazol-2-yl-, 6-carboethoxybenzthiazol-2-yl-, 6-methylsulfonylbenzthiazol-2-yl-, triazol-2-yl-, 1,3,4-thiadiazol-2-yl-, 1,3,5-thiadiazol-2-yl- and 4-phenyl-1,3,5-thiadiazol-2-yl-, $R_1$ is phenyl, benzyl or $C_1$–$C_4$-alkyl, $R_2$ is hydrogen, benzyl or $C_{1-2}$ alkyl or said alkyl substituted by cyano or $C_{1-2}$ alkoxy, Y' is —(CH$_2$)$_2$— or —(CH$_2$)$_3$—, acyl is $C_1$–$C_3$ alkanoyl, benzoyl, $C_1$–$C_2$-alkoxycarbonyl, phenylsulfonyl, methylsulfonyl, aminocarbonyl or aminocarbonyl N-substituted by phenyl or $C_1$–$C_4$-alkyl, and wherein the pyridinium radical is unsubstituted or substituted by methyl, and $X^-$ is an anion.

2. A basic azo-dyestuff as claimed in claim 1, wherein acyl is acetyl.

3. A basic azo-dyestuff as claimed in claim 2, wherein X and Y is nitro or cyano and Z is chlorine or bromine.

4. Basic azo dyestuff as claimed in claim 1, wherein R" represents ethyl or methyl.

5. Basic azo dyestuff as claimed in claim 1, where $X^-$ represents —Cl, —Br, —I, =SO$_4$, —SO$_3$-alkyl, —SO$_3$-aryl or —SO$_3$—O—alkyl.

6. The basic azo dyestuff of the formula

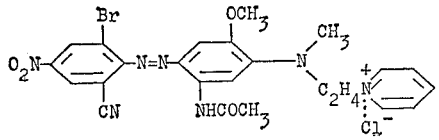

7. The basic azo dyestuff of the formula

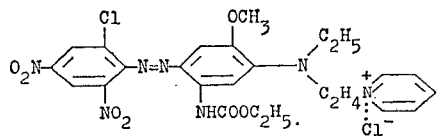

8. The basic azo dyestuff of the formula

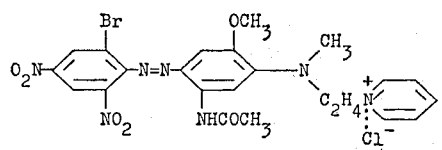

9. The basic azo dyestuff of the formula

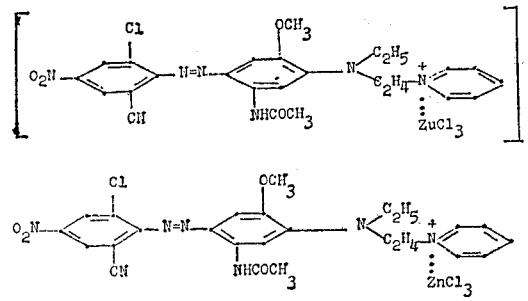

10. The basic azo dyestuff of the formula

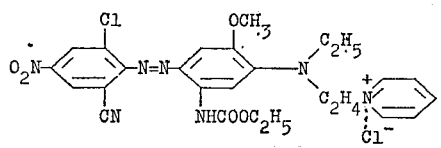

11. The basic azo dyestuff of the formula

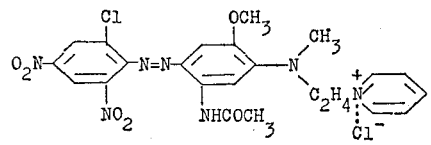

References Cited

UNITED STATES PATENTS

| 2,099,525 | 11/1937 | Krzikalla et al. | 560—156 X |
| 2,238,485 | 4/1941 | Dickey et al. | 260—205 |
| 2,972,508 | 2/1961 | Kruckenberg et al. | 260—156 X |
| 3,119,809 | 1/1964 | Nicolaus | 260—158 |
| 3,402,167 | 9/1968 | Entschel | 260—154 |
| 3,417,076 | 12/1968 | Sartori | 260—205 |

FLOYD D. HIGEL, Primary Examiner

U.S. Cl. X.R.

260—153, 154, 155, 206, 207, 286 Q, 287 R, 294.8 K, 295 K